United States Patent
Park

(10) Patent No.: US 7,752,368 B2
(45) Date of Patent: Jul. 6, 2010

(54) INTERRUPT SIGNAL PROCESSING CIRCUIT FOR SENDING INTERRUPT REQUESTS TO A COMPUTER SYSTEM

(75) Inventor: Hee-Chul Park, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 126 days.

(21) Appl. No.: 11/606,887

(22) Filed: Dec. 1, 2006

(65) Prior Publication Data
US 2007/0079040 A1    Apr. 5, 2007

Related U.S. Application Data

(62) Division of application No. 10/892,350, filed on Jul. 16, 2004, now Pat. No. 7,162,558.

(30) Foreign Application Priority Data

Jul. 22, 2003   (KR) ............................... 2003-50120

(51) Int. Cl.
G06F 12/00   (2006.01)
G06F 13/38   (2006.01)

(52) U.S. Cl. ...................... 710/240; 710/241

(58) Field of Classification Search ......... 710/260–269, 710/48–50, 240, 241; 711/152; 712/244
See application file for complete search history.

(56) References Cited

U.S. PATENT DOCUMENTS

| | | | | |
|---|---|---|---|---|
| 4,326,249 A | * | 4/1982 | Godsey | 710/48 |
| 4,353,279 A | * | 10/1982 | Deutsch | 84/605 |
| 4,417,302 A | * | 11/1983 | Chimienti et al. | 710/264 |
| 5,241,632 A | * | 8/1993 | O'Connell et al. | 710/117 |
| 5,274,774 A | * | 12/1993 | Manber et al. | 710/125 |
| 5,345,489 A | * | 9/1994 | Saitoh | 377/39 |
| 5,388,236 A | * | 2/1995 | Murakami et al. | 712/236 |
| 5,392,033 A | * | 2/1995 | Oman et al. | 710/107 |
| 5,410,708 A | * | 4/1995 | Miyamori | 710/264 |

(Continued)

FOREIGN PATENT DOCUMENTS

GB    2360612 A   *   9/2001

(Continued)

OTHER PUBLICATIONS

"Fast context switching by hierarchical task allocation and reconfigurable cache" by K. Tanaka (abstract only) Publication Date: Jul. 17, 2003.*

Primary Examiner—Mark Rinehart
Assistant Examiner—Christopher A Daley
(74) Attorney, Agent, or Firm—Harness, Dickey & Pierce, P.L.C.

(57) ABSTRACT

A computer system associated with a plurality of interrupt sources that produce interrupt signals may include interrupt signal processing blocks corresponding to the interrupt sources, respectively. Each of the interrupt processing blocks can include: a counter for generating an interrupt count value associated with the number of interrupt signals received from the corresponding interrupt source; a first register for storing the interrupt count value; a logic circuit for to generate an interrupt request signal according to the interrupt count value; and a second register for storing a service routine address associated with the interrupt source.

9 Claims, 4 Drawing Sheets

U.S. PATENT DOCUMENTS

| | | | | |
|---|---|---|---|---|
| 5,535,380 | A * | 7/1996 | Bergkvist et al. | 713/502 |
| 5,555,430 | A * | 9/1996 | Gephardt et al. | 712/16 |
| 5,594,873 | A * | 1/1997 | Garrett | 710/300 |
| 5,606,713 | A * | 2/1997 | Wisor et al. | 712/40 |
| 5,805,883 | A * | 9/1998 | Saitoh | 718/105 |
| 5,918,057 | A * | 6/1999 | Chou et al. | 710/260 |
| 5,931,936 | A * | 8/1999 | Chung et al. | 710/263 |
| 5,951,669 | A * | 9/1999 | Bailey et al. | 710/260 |
| 5,991,693 | A * | 11/1999 | Zalewski | 701/300 |
| 6,078,747 | A * | 6/2000 | Jewitt | 717/164 |
| 6,163,829 | A * | 12/2000 | Greim et al. | 710/260 |
| 6,185,652 | B1 * | 2/2001 | Shek et al. | 710/263 |
| 6,378,022 | B1 * | 4/2002 | Moyer et al. | 710/260 |
| 6,502,152 | B1 * | 12/2002 | Laurenti | 710/264 |
| 6,543,000 | B1 * | 4/2003 | Wright | 713/500 |
| 6,581,120 | B1 * | 6/2003 | Ko | 710/262 |
| 6,715,093 | B1 * | 3/2004 | Farmer et al. | 713/400 |
| 6,807,595 | B2 * | 10/2004 | Khan et al. | 710/260 |
| 6,917,997 | B2 * | 7/2005 | Bhagat | 710/261 |
| 6,950,887 | B2 * | 9/2005 | Chapple et al. | 710/55 |
| 6,993,613 | B2 * | 1/2006 | Connor et al. | 710/260 |
| 7,120,718 | B2 * | 10/2006 | Pezzini | 710/265 |
| 7,162,558 | B2 * | 1/2007 | Park | 710/260 |
| 2002/0181455 | A1 * | 12/2002 | Norman et al. | 370/389 |
| 2004/0003027 | A1 * | 1/2004 | Rollig et al. | 709/201 |
| 2004/0177192 | A1 * | 9/2004 | Pezzini | 710/260 |
| 2004/0199694 | A1 * | 10/2004 | Yiu et al. | 710/264 |
| 2005/0021893 | A1 * | 1/2005 | Park | 710/260 |

FOREIGN PATENT DOCUMENTS

| | | | |
|---|---|---|---|
| KR | 1020020088549 | A | 11/2002 |

\* cited by examiner

Fig. 4

ICR0

| CFLAG0[31:8] | CSET0[7] | S0[6:1] | EN0[0] |
|---|---|---|---|
| ICNT0[63:32] ||||

INTERRUPT SIGNAL PROCESSING CIRCUIT FOR SENDING INTERRUPT REQUESTS TO A COMPUTER SYSTEM

CROSS-REFERENCE TO RELATED APPLICATIONS

This application is a divisional of application Ser. No. 10/892,350 filed Jul. 16, 2004, now U.S. Pat. No. 7,162,558 issued on Jan. 9, 2007, and from which priority is claimed under 35 U.S.C. §1 This application also claims priority from Korean Patent Application No. 2003-50120 filed on February Jul. 22, 2003, in the Korean Intellectual Property Office under 35 U.S.C. §119. The entire contents of both of these applications are incorporated herein by reference.

BACKGROUND OF THE INVENTION

In computer systems, there is a type of asynchronous signaling technique known as an interrupt. While the occurrence of each interrupt is asynchronous, the handling of interrupts can be managed cyclically or non-cyclically. When interrupts occur in peripheral equipment of a computer system, an interrupt controller receives the interrupts and stores them at an internal register and then sends an interrupt request (IRQ) to the CPU in accordance with a priority among the interrupt sources. The CPU receiving the IRQ carries out an appropriate service routine depending on the interrupt source.

The computer system should include information about the various interrupt sources and should provide the operating system (or operating program) with such information. Such information about the interrupt sources is used by the interrupt controller to handle the interrupts. The interrupt controller loads such information in the form of an interrupt source table. Where interrupt sources are polled by the interrupt controller, a count is incremented as the next interrupt source is polled. The internal register that stores the interrupts can be organized according to the count value. When the interrupt controller generates an IRQ, it determines the appropriate service routine for the interrupt that is to be serviced by indexing into the source table using the count value.

However, reading the source table into volatile memory and indexing into the source table represents a load on the CPU. As a result, such loading is a significant factor in performance degradation of the computer system.

SUMMARY OF THE INVENTION

At least one embodiment of the present invention is directed to an interrupt processing circuit of a computer system that substantially obviates one or more problems due to limitations and disadvantages of the related art.

At least one embodiment of the present invention provides an efficient interrupt processing circuit without decreasing system performance.

At least one embodiment of the present invention provides a computer system associated with a plurality of interrupt sources that produce interrupt signals respectively. Such a computer system may include interrupt signal processing blocks corresponding to the interrupt sources, respectively. Each of the interrupt processing blocks can include: a counter for generating an interrupt count value associated with the number of interrupt signals received from the corresponding interrupt source; a first register for storing the interrupt count value; a logic circuit for to generate an interrupt request signal according to the interrupt count value; and a second register for storing a service routine address associated with the interrupt source.

Additional features and advantages of the invention will be more fully apparent from the following detailed description of example embodiments, the accompanying drawings and the associated claims.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings:

FIG. 4 is a constitution diagram in more detail the interrupt count register of FIG. 3, according to at least one embodiment of the present invention.

DETAILED DESCRIPTION OF THE INVENTION

Reference will now be made in detail to example embodiments of the present invention, which are illustrated in the accompanying drawings. However, the present invention is not limited to the example embodiments illustrated herein after, and the example embodiments herein are rather introduced to provide easy and complete understanding of the scope and spirit of the present invention.

A computer system according to at least one embodiment of the present invention is connected to a plurality of peripheral devices to carry out operations and also carries out service routines according to an interrupt generated from the peripheral devices.

Figure 1:
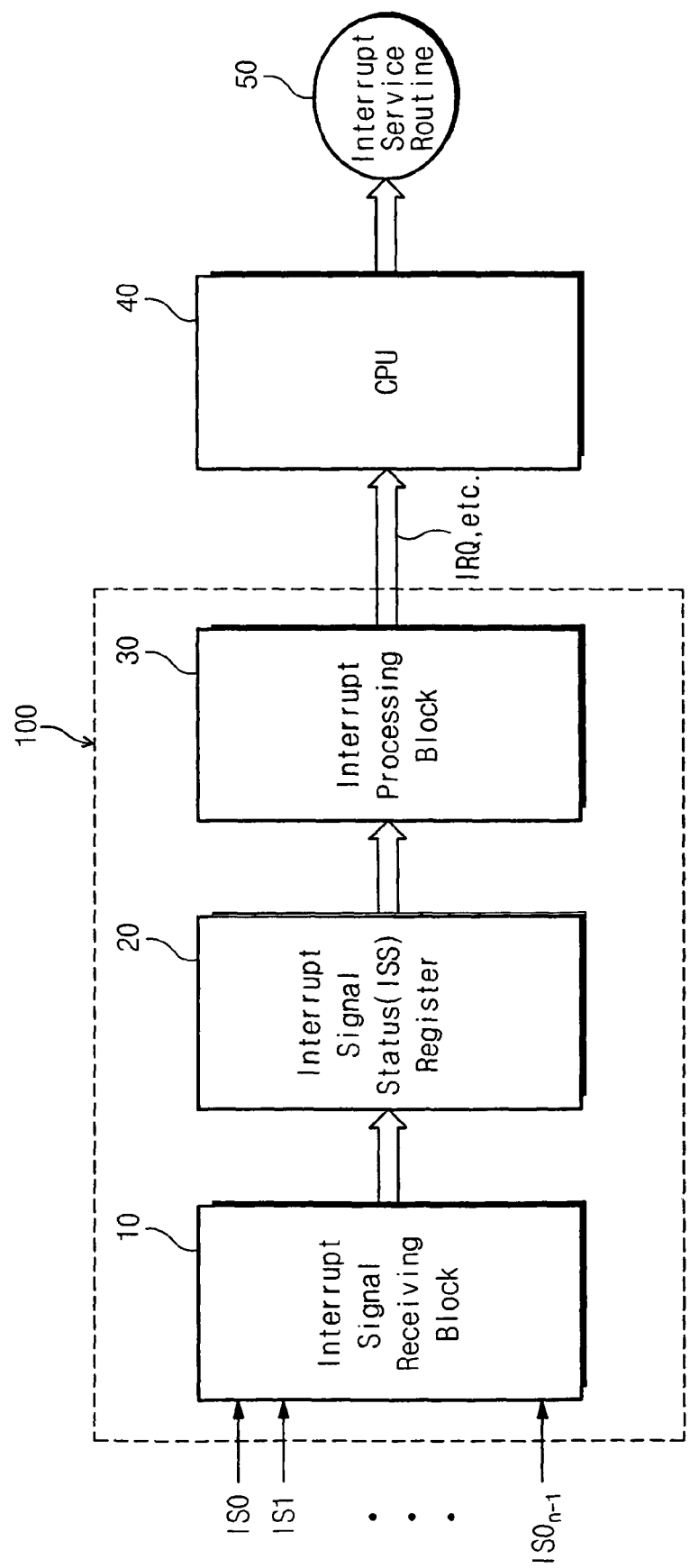
FIG. 1 is a block diagram showing components of computer system, according to at least one embodiment of the present invention.

FIG. 1 shows an interrupt handling arrangement 100 in accordance with at least one embodiment of the present invention. As shown in FIG. 1, interrupt signals IS0~ISn-1, which are generated from peripheral devices of the computer system, are received by an interrupt signal receiving block 10. Then, they are stored in an interrupt signal status (ISS) register 20. Next, an interrupt processing block 30 prioritizes the pending interrupts and generates information at least about source of the highest priority interrupt signal based upon the content of the ISS register 20 and provides to a CPU 40 information about the interrupt source (e.g., address of an appropriate service routine for the interrupt). The CPU 40 then carries out the identified service routine 50.

Figure 2:
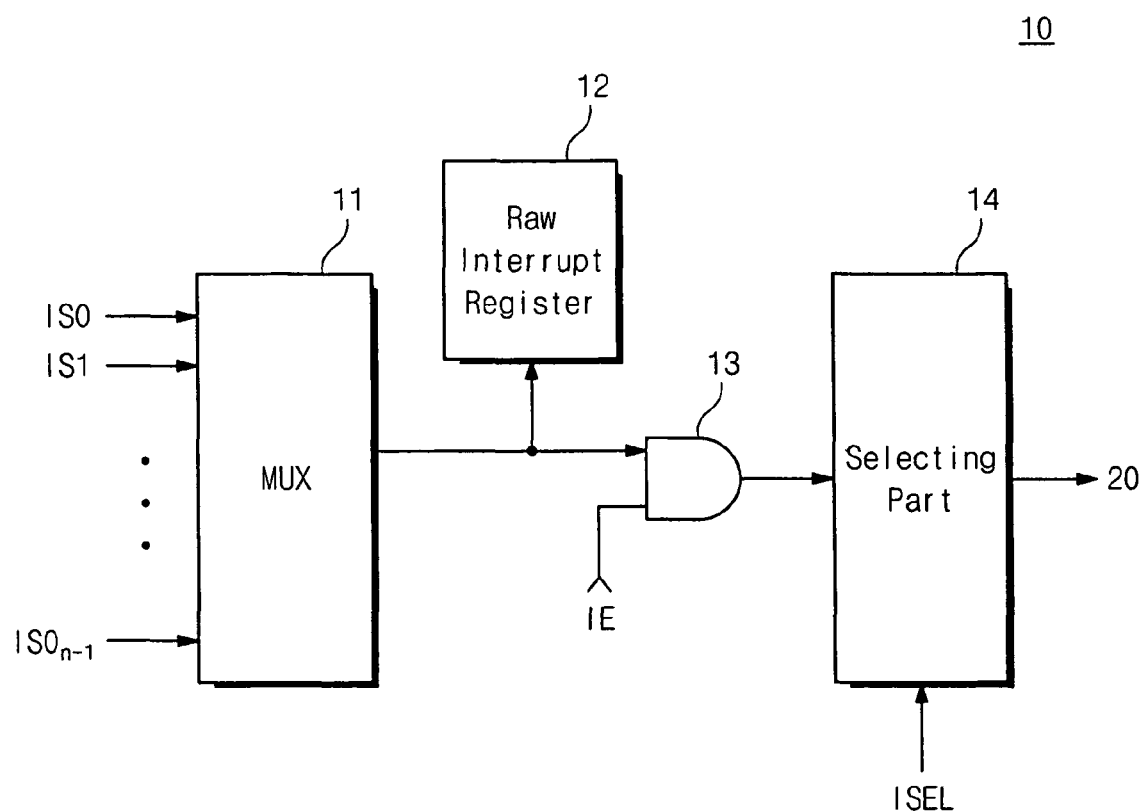
FIG. 2 is a block diagram showing in more detail an interrupt signal receiving block, according to at least one embodiment of the present invention.

FIG. 2 shows in more detail the interrupt signal receiving block 10 of FIG. 1, according to at least one embodiment of the present invention. Interrupt signals IS0-ISn-1 generated externally are selectively input through a multiplexer 11. Then, they are selectively stored at a raw interrupt register 12. In addition, selected input interrupt signals are masked through an AND gate 13 and a selecting part 14 depending on an interrupt activation control (IE), and then are represented in the IRQ status register 20 as interrupt bits ISB0, . . . ISBn-1.

Upon completion of an interrupt service routine, the raw interrupt register 12 is reset and becomes available to store another interrupt signal. The ISS register 20 can represent each interrupt signal as a bit, for example, a bit for each of 32 interrupt sources.

Figure 3:
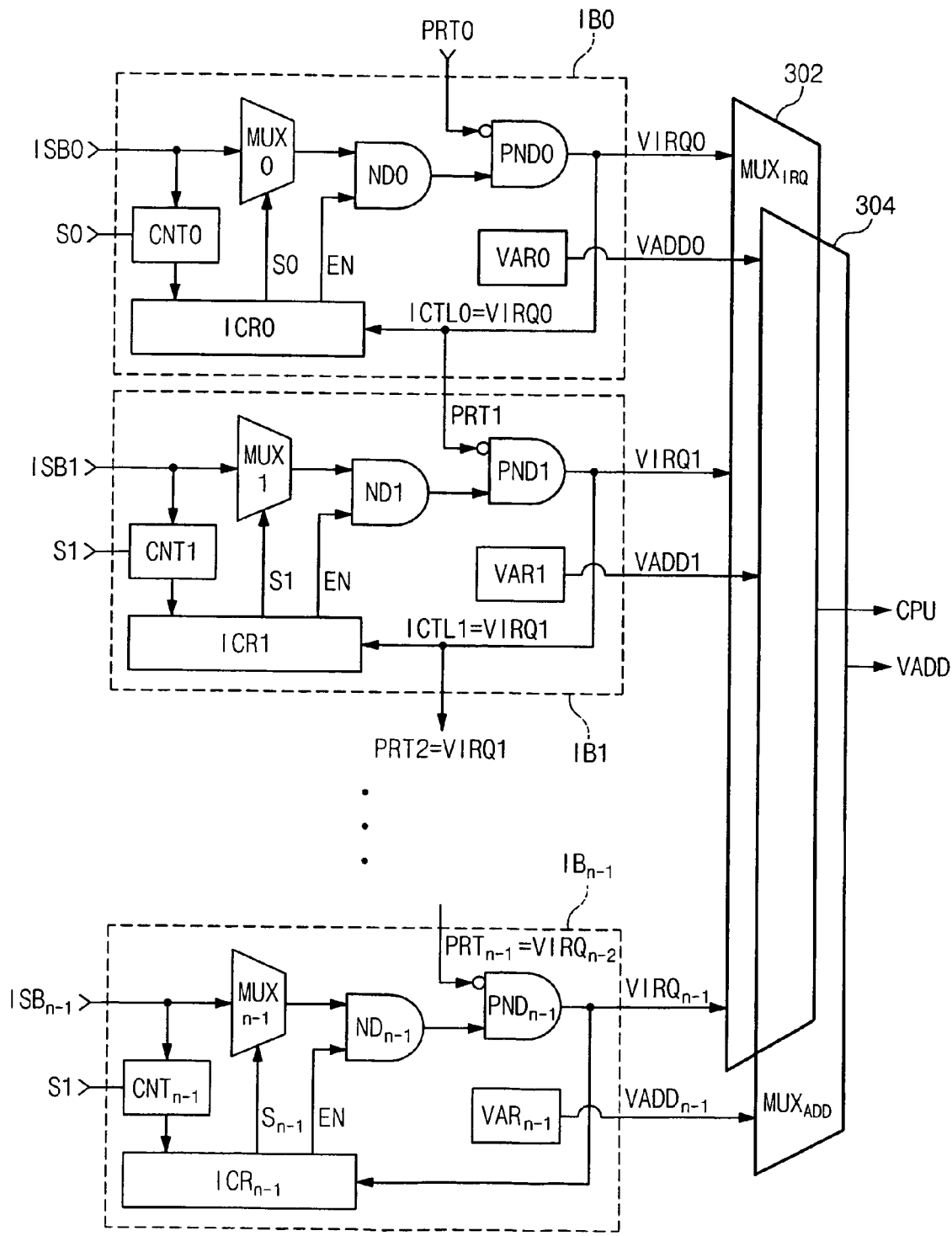
FIG. 3 is a circuit diagram showing in more detail an interrupt processing block, according to at least one embodiment of the present invention.

FIG. 3 is a block diagram showing the interrupt processing block 30 of FIG. 1 in more detail, according to at least one embodiment of the present invention. The interrupt processing block 30 shown in FIG. 3 comprises unit blocks IB0~IBn−1, which correspond to interrupt sources 0 ..., n−1, respectively. The unit blocks IB0~IBn−1 provide interrupt request (IRQ) signals, respectively, to the CPU 40 in accordance with the priority of interrupt sources.

Referring to FIG. 3, source values S0~Sn−1 (set in advance) as well as the interrupt bits ISB0~ISBn−1, which are supplied from the ISS register 20, are input to the unit blocks IB0~IBn−1, respectively. The unit blocks IB0~IBn−1 generate IRQ signals VIRQ0~VIRQn−1. The signals VIRQ0—VIRQn−1 have priority information (set in advance) with respect to the interrupt sources, respectively. Additionally, the unit blocks IB0—IBn−1 generate (or store) address signals VADD0~VADDn−1 for the interrupt service routines corresponding to the interrupt sources.

A selected one VIRQ1 of IRQ signals VIRQ0~VIRQn−1 generated from the unit blocks IB0~IBn−1 and is supplied through a multiplexer 302 to the CPU, thereby indicating that there is an interrupt that needs to be serviced. The corresponding address VADDi is correspondingly supplied via multiplexer 304.

The IRQ signal VIRQi generated from each unit block IBi also is treat as the enabling signal PRTi+1 for the next unit block IBi+1.

All unit blocks can be constructed in the same way. For example, unit block IB0 can include, a single-input multiplexer (or switch) MUX0, a counter CNT0, an interrupt count register ICR0, a logic gate ND0, a logic gate PND0 and an address register VAR0.

The multiplexer MUX0, being a 1:1 multiplexer (or switch), inputs an interrupt bit ISB0 supplied from the ISS register 20. The multiplexer MUX0 selectively outputs the interrupt bit ISB0 to the AND gate ND0 in response to a source value S0 supplied from the interrupt count register ICR0. The logic gate ND0 responds to an enable signal EN supplied from an interrupt count register ICR0 to transfer the interrupt bit ISB0 to the logic gate PND0. The logic gate PND0 is controlled by the priority signal PRT0 to transfer the source bit ISB0 as the output signal IRQ signal VIRQ0.

The IRQ signal VIRQ0 is also treated as the priority signal PRT1 in the second unit block IB1 and can be employed as a control signal (also referred to as ICTL0). The control signal ICTL0 can be applied to the interrupt count register ICR0 to control the interrupt count value.

The address register VAR0 corresponds to interrupt bit ISB0 at a ratio of 1:1 and stores an address of the interrupt service routine assigned to the source of interrupt bit ISB0. The counter CNT0 counts the number of instances of interrupt bit signals ISB0 in an increment equal to S0 (or, in other words, S0 is the modulus) and transfers the value to the interrupt count register ICR0 where it is stored.

FIG. 4 is a diagram of an $i^{th}$ interrupt count register, ICRi, e.g., ICR0, of FIG. 3 shown in more detail, according to at least one embodiment of the present invention. In the example case in which the interrupt count register ICR0 is constituted with 32 bits, as shown in FIG. 4, bits can be allotted as follows: 1 bit EN0[0] for the enable signal capable of controlling the logic gate ND0; 6 bits S0[6:1] for the modulus in modulo counting and for the source value capable of controlling the multiplexer MUX0; 1 bit CSET0[7] for resetting interrupt counting operation; 24 bit CFLAG0[31:8] for a count flag; and 32 bit ICNT0[63:32] for the interrupt count value.

Now, the operation of the interrupt handling arrangement 100 will be described hereinafter according to at least one embodiment of the present invention.

The value of the interrupt bit stored at the ISS register 20 is provided to the corresponding unit block IB(i). If the value of the received interrupt bit indicates that an interrupt signal has been received, then the counter (e.g., CNT0) will modulo-count (using modulus Si), e.g., modulus S0, and if during a count increment cycle/iteration the corresponding service routine is not performed, then the interrupt count value ICNT0[63:32] of the interrupt count register is incremented. The interrupt count value ICNT0[63:32] may increase from 0x1 to a maximum 0xffffffff, as set by an user via the count flag, e.g., CFLAG0[31:8].

Instances of interrupt signals are accumulated continuously in the count values of the bits ICNTi[63:32] of the units blocks IB0, ..., IBn−1. Typically, it is necessary to disable the CSETi[7] (to avoid resetting the count) so that the respective accumulations (count values) can grow. In addition, in case the interrupt count value is required to be over a typical maximum range (e.g., 0xffffffff), then the atypical maximum value of accumulation count may become 0xffffffx0xffffff by increasing the value of the count flag CFALGi[31:8] by one unit. The maximum interrupt count value is applicable to N interrupt sources, respectively. The interrupt count value is stored in the bits ICNTi[63:32] of the interrupt count register ICRi of the unit block IBi corresponding to the $i^{th}$ interrupt source.

During an iteration, in the case that an $i^{th}$ one of the N interrupt sources is selected (depending on priority) and its IRQ is provided to the CPU 40, then the bit CSETi[7] of the interrupt count register ICRi is set (enabled) so that the count value in the bits INCTi[63:32] is reset to zero instead of incremented. But the count values in the bits INCTi[63:32] of the other unit blocks IB0, ..., IBi−1 and IBi+1, ..., IBn−1, respectively, are incremented as normal.

A series of system operations including the count increment are cyclically carried out (iterated). IRQ signals are hierarchically generated and presented to CPU 40. As a result, inefficiency caused by unlimitedly waiting for interrupt signal reaction is removed, so that it is possible to prevent reducing system performance due to balancing/prioritizing multiple IRQs interrupt.

As previously mentioned, according to at least one embodiment of the present invention, the degradation of system performance due to a conventional software mode of tending IRQs can be reduced by offloading the prioritizing of IRQs, etc. to hardware other than the CPU.

Furthermore, according to at least one embodiment of the present invention, accumulation of the interrupt counts can progress during performance of a service routine with respect to a selected interrupt signal, so that it is possible to increase efficiency of interrupt signal management.

The invention being thus described, it will be obvious that the same may be varied in many ways. Such variations are not to be regarded as a departure from the spirit and scope of the invention, and all such modifications are intended to be included within the scope of the invention.

What is claimed is:
1. A computer system associated with a plurality of interrupt sources that produce interrupt signals, respectively, the computer system comprising:

interrupt signal processing blocks corresponding to the interrupt sources, respectively, each of the interrupt processing blocks including, a counter for generating an interrupt count value associated with the number of interrupt signals received from the corresponding interrupt source, a first register for storing the interrupt count value, a logic circuit to generate an interrupt request signal according to the interrupt count value, and a second register for storing a service routine address associated with the interrupt source, wherein the interrupt signal processing blocks are cascade-connected with each other in an arrangement that imposes a prioritization amongst the interrupt signal processing blocks, and wherein each interrupt signal processing block is configured to prioritize the received interrupt signal and generate the interrupt request signal corresponding to the respective interrupt source.

2. The computer system of claim 1, wherein the first register also stores a value of a count flag upon which is based the maximum value for the interrupt count value.

3. The computer system of claim 1, wherein the counter selectively and iteratively increments.

4. The computer system of claim 1, wherein the counter is operable to modulo-count based upon a modulus associated with the corresponding interrupt source.

5. The computer system of claim 4, wherein the modulus of the counters are sized, respectively, to impose collectively a prioritization amongst the interrupt signal processing blocks.

6. The computer system of claim 1, wherein:

there are N interrupt signal processing blocks each of the interrupt signal processing blocks (ISPBs) includes a control signal input; and the interrupt request signal for ISPB(i), for $1 \leq i \leq N-2$, is the input control signal for ISPB(i−1).

7. An interrupt prioritization apparatus associated with a plurality of interrupt sources that produce interrupt signals, respectively, the apparatus comprising:

a plurality of circuits corresponding to the plurality of interrupt sources, respectively, to process instances of interrupt signals corresponding to the plurality of interrupt sources, and to produce corresponding interrupt request signals, respectively, each of the circuits including, counting means for counting the number of interrupt signals received from the corresponding interrupt source and outputting an interrupt count value, first memory means for storing the interrupt count value, logic means for generating the interrupt request signal according to the interrupt count value, and second memory means for storing a service routine address associated with the interrupt source, wherein the plurality of circuits are cascade-connected with each other in an arrangement that imposes a prioritization amongst the plurality of circuits, and wherein each circuit is configured to prioritize the received interrupt signal and generate the interrupt request signal corresponding to the respective interrupt source.

8. The apparatus of claim 7, wherein the counting means is further for modulo-counting the interrupt signals based upon a modulus associated with the corresponding interrupt source.

9. The computer system of claim 8, wherein the modulus of the counters are sized, respectively, to impose collectively a prioritization amongst the interrupt signal processing blocks.

* * * * *